United States Patent

Serracchioli et al.

[15] 3,648,251

[45] Mar. 7, 1972

[54] TERMINAL APPARATUS FOR TRANSMITTING AND RECEIVING INFORMATION

[72] Inventors: Francesco Serracchioli, Banchette; Antonio Bartocci, Ivrea, both of Italy

[73] Assignee: Ing. C. Olivetti & C.S.p.A., Ivrea (Turin), Italy

[22] Filed: Jan. 29, 1969

[21] Appl. No.: 794,870

[30] Foreign Application Priority Data

Feb., 1968 Italy ................................50567-A/68

[52] U.S. Cl. ..........................................................340/172.5

[51] Int. Cl. .......................................G06f 3/12, G06f 13/02

[58] Field of Search ...............................................340/172.5

[56] References Cited

UNITED STATES PATENTS

| | | | |
|---|---|---|---|
| 3,241,120 | 3/1966 | Amdahl | 340/172.5 |
| 3,248,705 | 4/1966 | Damann et al | 340/172.5 |
| 3,305,840 | 2/1967 | Shia | 340/172.5 |
| 3,346,853 | 10/1967 | Koster et al | 340/172.5 |
| 3,351,917 | 11/1967 | Shimabukuro | 340/172.5 |
| 3,364,473 | 1/1968 | Reitz et al | 340/172.5 |
| 3,368,028 | 2/1968 | Windels et al. | 178/4.1 |
| 3,430,210 | 2/1969 | Foure et al | 340/172.5 |
| 3,469,244 | 9/1969 | Perotto et al. | 340/172.5 |
| 3,495,222 | 2/1970 | Perotto et al. | 340/172.5 |

*Primary Examiner*—Raulfe B. Zache
*Assistant Examiner*—Jan E. Rhoads
*Attorney*—Birch, Swindler, McKie & Beckett

[57] ABSTRACT

A display and printing terminal for a data processing system including a serial recirculating store for storing the information to be sent to or received from the processing system, a keyboard for entering information into the store and a display device for displaying the information in the store. A selectively actuable printing device which operates asynchronously with the store, prints out the information contained in the store. The recording of control characters at selected locations in the store allow portions of the information to be deleted during print out.

3 Claims, 4 Drawing Figures

INVENTORS
FRANCESCO SERRACCHIOLI
ANTONIO BARTOCCI

Patented March 7, 1972

3,648,251

3 Sheets-Sheet 2

INVENTORS
FRANCESCO SERRACCHIOLI
ANTONIO BARTOCCI

Patented March 7, 1972 3,648,251

3 Sheets-Sheet 3

*INVENTORS*
FRANCESCO SERRACCHIOLI
ANTONIO BARTOCCI

TERMINAL APPARATUS FOR TRANSMITTING AND RECEIVING INFORMATION

BACKGROUND OF THE INVENTION

The present invention relates to terminal transmitting and receiving apparatus which can be connected to a central data processor and is provided with a visual display device for data transmitted and received and a printing device for reproducing the visually displayed data in the form of a permanent copy.

The present invention concerns improvements in the terminal data-transmitting apparatus providing visual display such as that described in our copending U.S. Pat. application Ser. No. 764,709, filed Oct. 3, 1968. In the present application the terminal data-transmitting apparatus comprises a delay-line store or other similar cyclic store, a cathode-ray tube visual display device for visual display of the data contained in said store, a matrix unit for supplying a representation of each of the successive characters read from the store and means for feeding the visual display device with the successive lines of the matrix representation of each character. A certain line of all the characters in the store is transmitted to the visual display device before transmitting the following line of all the characters, the scanning of the cathode-ray tube being synchronized with the rhythm of the circulation of the data in the store.

A keyboard is provided for entering characters, each in a store cell, the store being provided with means for entering each character in that cell which is currently marked by an identification sign or tag bit and with means which, following on the entry of each character, are adapted to shift the identification sign automatically to the following cell. Further means actuated by a key are provided for shifting the identification sign by one or more cells independently of the automatic-shift means.

In practice, it is frequently necessary or convenient to obtain a permanent copy, for example on a sheet of paper, of the contents of the visual display device, reproduced either perfectly alike or in a modified version, for example by changing the makeup of the contents by the addition of notes or other data, or by choosing only a part of the contents for the reproduction.

In other cases in which there is a central data processor connected to a terminal apparatus for printing the data supplied at the output, it is often useful to have inserted between the output of the processor and the printing equipment a video monitor which enables the message supplied at the output of the processor to be checked before it is transmitted for printing, and also a keyboard which allows possible errors to be corrected or other data to be added to the message received before it is printed.

In other cases still, in which there are available archives of information recorded on special record members and apparatus for reading these record members and for printing the information content in readable form, for example on other record members, it is useful to be able to find the information on record and have a readable representation thereof on a visual display device and, moreover, have a keyboard available for complementing the information before transmitting it to the printing device.

In terminals of known type for the transmission to a processing system of data with visual display, in order to obtain a permanent reproduction of the visually displayed data on a given record member, for example a sheet of paper, it is necessary to use a photographic copier. This solution entails the enormous disadvantage of rendering the reproduction operation slow, apart from the need to have suitably designed photographic apparatus available.

This problem is especially difficult to solve in terminals using a cyclic-recirculating store for storing the information being displayed and transmitted or received. In order for the store to be fast enough to work efficiently with the display device and with the processing system, its recirculation frequency must be many times higher than the operational speed of any practical printer.

SUMMARY OF THE INVENTION

In order to avoid such drawbacks and to achieve the aforesaid advantages, the present invention provides terminal apparatus for transmitting and receiving data comprising a recirculating serial store having a succession of cells for storing characters, a display device for displaying visually data contained in the store, and a selectively actuable printing device for producing a permanent record of data contained in the store, the printing device being arranged to operate asynchronously with respect to the cYcles of the recirculating store.

The terminal apparatus embodying the invention and described below enables a permanent reproduction of the data shown by the visual display device to be obtained without being limited as to format and moreover permits a large number of copies of the reproduction to be obtained.

BRIEF DESCRIPTION OF THE DRAWINGS

The invention will be described in more detail, by way of example, with reference to the accompanying drawings, in which.

DETAILED DESCRIPTION

Figure 1:
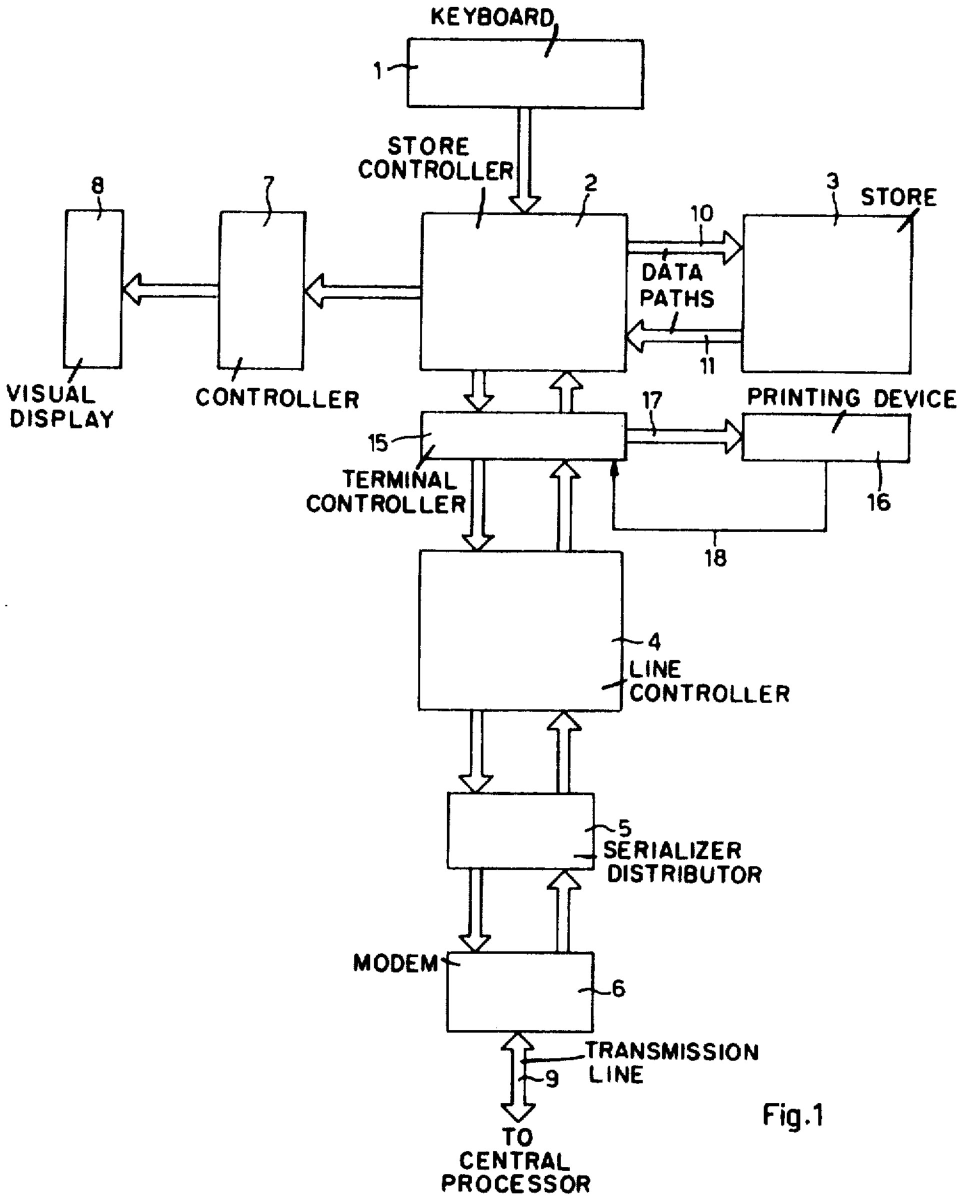
FIG. 1 is a block diagram of a complete terminal apparatus embodying the invention.

Referring to FIG. 1, a keyboard 1 comprises alphabetical and numerical keys and function keys for controlling the message. Each character entered from the keyboard by means of an alphabetical or numerical key is sent to the store 3 under the control of the store controller 2 and at the same time sets in action the controller 7 of the visual display unit 8 which in turn effects the actual visual display of the character on a cathode-ray tube. The successive characters of the message are entered on the key board and visually displayed in like manner. The message introduced into the store in this way remains therein at the disposal of the central processor. Moreover, owing to the persistence on the screen, it remains fully displayed. When the central processor so requires, the line controller 4 controls the store controller 2 through the terminal controller 15 to order the extraction of the message from the store. The message is therefore extracted character by character. Each character extracted in this way is serialized by the serializer-distributor 5 and then, via the modulator of the modem 6, is sent over the transmission line 9 to the central computer. When, on the other hand, the central processor wishes to send a message to the terminal, on receipt of the request the line controller 4 establishes the conditions of reception, so that, when the terminal is ready to receive, the bits of information received on the line 9 and demodulated by the modem 6 are put in parallel by the serializer-distributor 5 in such manner as to compose the individual characters, which enter the store 3 through the line controller 4, the terminal controller 15 and the store controller 2 and then appear on the visual display device 8.

When the terminal is not in communication with the central processor, the terminal controller 15 is able, on selection from the keyboard 1, to establish connection of the terminal itself with a printing device 16, effecting in this way the transfer of the message present in the store and the reproduction thereof in permanent form on a recording medium.

The terminal controller 15 establishes and checks the following states: terminal free, terminal assigned to the keyboard, terminal assigned to the central processor both for transmission and for reception, and terminal assigned to the printing device.

Figure 4:
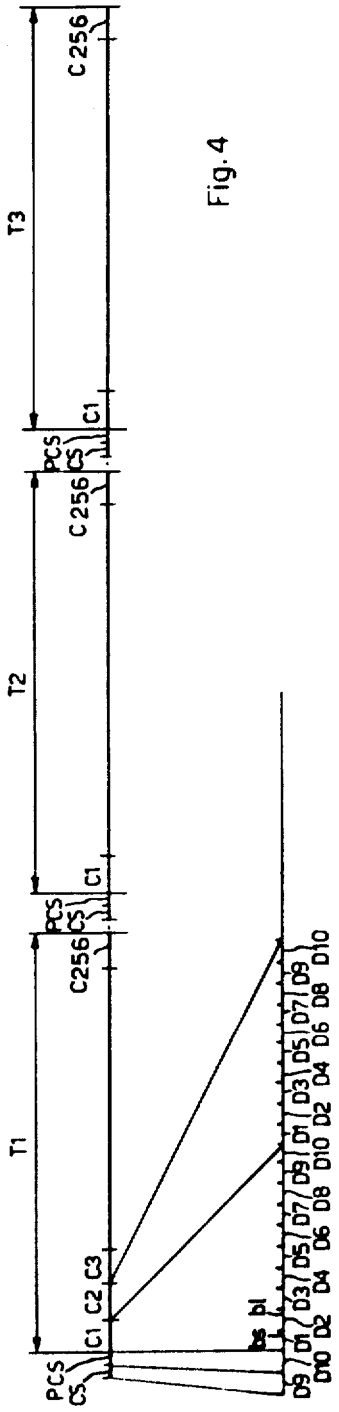
FIG. 4 is a time diagram relative to the operation of the store of the terminal apparatus.

The store 3 is constituted by a magnetostrictive delay line provided with an output 11 and an input 10 (FIGS. 1 and 2) connected to an output amplifier 13 and an input amplifier 14, respectively. In the illustrated embodiment of the invention the delay line has a capacity of one block of 256 characters. More particularly (FIG. 4), each store cycle T comprises 256 digit periods C1 to C256, each comprising 10 bit periods D1 to D10.

Each character in the store is represented by seven bits respectively stored in the seven binary places corresponding to the bit periods D3 to D9. The binary place corresponding to the bit period D10 is used to contain a parity bit for the character. The binary place corresponding to the bit period D1 is used to contain a tag bit *bs*=1 which, during the operation of writing in the store, is gradually shifted from one digit period (store cell) to the next one to indicate step by step the digit period (store cell) in which the successive characters are to be entered.

Similarly, the binary place corresponding to the second bit period D2 is used to contain a tag bit *bl*=1 which, during the operations of reading from the store, is gradually shifted from one digit period to the next one to indicate the digit period (store cell) in which the successive characters to be extracted from the store are read.

In front of the 256×10 binary places of the store there is a binary place used to contain a timing start bit CS and a binary place containing the reference parity bit PCS. Whenever, (FIG. 2) the bit CS is read from the store through the line 72 and the circuit 27 (this happens during each storage cycle), the circuit 27 activates the line 95 and causes the starting of a timer 23 which supplies a signal MS at each bit period and also repeatedly supplies (FIG. 4) trains of ten signals D1 to D10 which serve precisely to identify the corresponding bit periods of each digit period. When the signal CS renders the timer 23 operative, it begins to operate, beginning with the signal D9. The circuit 27 may, for example, be of the type described in U.S. Pat. No. 3,495,222 which is assigned to the assignee of the present invention.

The keyboard 1 (FIG. 2) includes a store reservation key by means of which the operator can reserve the store to introduce the successive characters of a message therein by means of the numerical and alphabetical keys of the keyboard. The actuation of the store reservation key generates a signal PRET. A signal ASTAL is produced when, in consequence of the reservation, the store is assigned to the keyboard. When PRET and ASTAL are both present and, moreover, the line controller 4 indicates that the store is not engaged in a transmission with the computer, the timer 23 is caused to start. In addition, a tag bits control circuit 27, through the line 21, compels at the same time the writing of the timing start bit CS in the stage R9 of a stepping register 22 consisting of 10 stages R1 to R10.

In normal operating conditions, this stepping register R1–R10, in which the stepping on of the bits is commanded by the signals MS which are generated one at each bit period, is interposed between the output 11 of the store 3 and its input 10. Therefore, under normal conditions, the contents of the store 3 are regenerated through the stepping register R1–R10, being shifted in phase by one digit period at each store cycle.

After the reservation of the store the bit CS introduced into it in this way will continue to circulate therein to command through the line 95, at each cycle, the start of the timing after recognition by the tag bits control circuit 27.

At the time of the reservation operation, the tag bit *bs* is also recorded in the first binary place D1 of the first cell C1 of the store (that is in the binary place immediately following the parity bit PCS pertaining to the aforesaid timing bit CS). More particularly, this happens inasmuch as the signal PRET which is produced at that time by the keyboard acts through the medium of the tag bits control circuit 27 and causes, through the line 21, the writing of a bit equal to 1 in the first stage R1 of the register R1–R10 during the bit period D1 which appears first.

The circuit 26 connected to the output of the register 22 is adapted to count module 2 all the bits = 1 which appear at its input during the bit periods D3–D9. At each bit period D10, the contents of the circuit 26 are forced in this way represents the parity bit corresponding to the seven bits of the character as soon as they are introduced into the store from the output of the register R1–R10.

The synchronizing bit CS, the reference parity bit PCS and the tag bit *bs* which are introduced in the store reservation phase continue to circulate in the store until a character is entered on the keyboard. The keys of the keyboard 1 are locked in all the states in which the store is not assigned to the keyboard, that is the states in which the reservation signal PRET is not present. Therefore, in order to unlock the keyboard, it is necessary that the store be in the free state and that the store reservation key be actuated. The character entered on the keyboard 1 is sent in parallel over the line 71. When a character remains entered on the keyboard, the keyboard generates a signal ICTA which, through the medium of the circuit 27, causes the regeneration of the tag bit *bs* read on the line 72 in correspondence with a period D1 to occur via the line 21 at the following D1 period, whereby the bit is stepped on in the store by one digit period. Moreover, the reading of said signal *bs* in these conditions generates through the circuit 27 a signal CAR which causes the transfer of the character in parallel from the output 71 of the keyboard to the input 74 of the register 22. Thus the seven bits of the character are forced into the stages R3–R9. Then, due to the effect of the stepping signals MS, which are produced continuously, the character is shifted in the register 22 and entered in the store.

The following characters are introduced similarly into the store from the keyboard, entering in succession the store cells indicated by the bit *bs*. In this way the successive characters entered on the keyboard are introduced into the successive adjacent cells C1, C2, C3....of the store, starting from the first cell C1 following the beginning of the store. If, therefore, a number is concerned, which is usually entered on the keyboard starting from the most significant digit, the number has its most significant digit in the cell C1.

When it is necessary to enter in the store 3 a character originating from the transmission line through the medium of the line controller 4, the presence of this character in a character store in the line controller 4 is indicated to the store controller 2 by a signal ICCA produced by said controller 4. The signal ICCA permits the transfer of said character in parallel from the output 75 of the line controller 4 to the register 51.

The same signal ICCA operates via the circuit 27 to cause the regeneration of the tag bit *bs* read on the line 72 in correspondence with a certain D1 to occur via the line 21 at the following D1, so that the bit is stepped on in the store by one digit period. Moreover, the reading of the signal *bs* in these conditions generates via the circuit 27 a signal CAL which causes the transfer of the character from the register 51 to the input 74 of the register 22. Again the seven bits of the character, plus the parity bit of the character, are forced into the stages R3–R10. Due to the effect of the continuously produced stepping signals MS, the character is shifted in the register 22 and entered in the store.

When the message stored in the delay line is to be sent to the central processor, the terminal must be in the transmission state, which condition is indicated by the line controller 4 by means of a signal LG. That is, if the store 3 is assigned to the computer, this condition is signalled by the terminal controller 15 and the line controller 4 generates a store-reading order signal LG for the computer.

In response to the signal LG, the circuit 27 forces the writing via line 21 of a tag bit *bl* in the register 22 at the first bit period D2 immediately after having recognized, through the line 72, the timing start bit CS. In the following store cycle, the effect of the reading order LG on the circuit 27 is to cause the regeneration of the aforesaid tag bit *bl* read on the line 72 not to occur through the line 21 at the first D2 period encountered, but at the following one, whereby the bit is stepped on in the store by one digit period. Moreover, the reading of the bit *bl* under these conditions generates through the circuit 27 a signal CAG which causes the transfer in parallel of the bits of the character store present in the line controller 4.

In all the phases in which the store is free (signal L) or assigned to the keyboard (signal AST) and provided that the store-reading order LG is not present, the characters circulating in the delay-line store are visually displayed on a cathode-ray screen. That is, there are visible on the screen both the characters introduced from the keyboard, because the "assigned to keyboard" state of the terminal is obtained on reservation before the manual entry of the message on the keyboard, and the characters received from the computer after they have been checked and entered in the store, since at the end of reception the transmission controller brings the terminal back to the "free" state. The logical sum of the signals L and AST respectively representing the "free" and "assigned to keyboard" states is applied to a coincidence circuit 76. If the signal LG, which, as has been explained, supplies the reading order, is not present, that is the terminal is not in the transmission state and, moreover, there is absent the signal LS, which, as will be explained hereinafter, enables transfer to the printing device, the coincidence circuit 76 supplies the signal ASTAL which, at each bit period D1, enables transfer of the character which is in the register 22, that is in the stage R3–R10 of that register, in that period to the register 51 formed by nine stages RU1–RU9, the first eight of which are adapted to contain the character, while the ninth is adapted to store the tag bit *bs*=1 which may possibly be associated therewith.

During the visual display, the register 51 functions as an input register for the display device. The character present in the register 51 is decoded by a decoder 54, which is provided with a number of output wires (character wires) equal to the number of characters of the alphabet, the ten decimal digits and the associated signs, such as +, −, comma, etc. The decoder 54 feedS a matrix 55 constituted by seven rows and five columns of magnetic cores. The aforesaid character wires are linked together with the cores of the matrix in such a manner that, when the decoder 54 activates a certain character wire, all and only those cores which give spatially the form of the character concerned are set. Therefore, in the matrix 55, each character is represented by a spatial distribution of 7×5=35 bits.

Through the line 95, each timing start signal CS read from the store causes a row counter 56 to advance by one step, this counter counting the seven rows of the core matrix cyclically and repeatedly. The counter 56 therefore advances by one step at each store cycle.

The row counter 56 is decoded by a decoder 57, which activates the rows of the core matrix one after the other, whereby each row remains operative for an entire cycle of the delay-line store, that is until the next timing start CS, when the following row will begin to be activated. More particularly, the outputs of the decoder 57 are connected to separate interrogation wires L1 to L7 which are linked together with all the cores in the relevant row.

Figure 2:
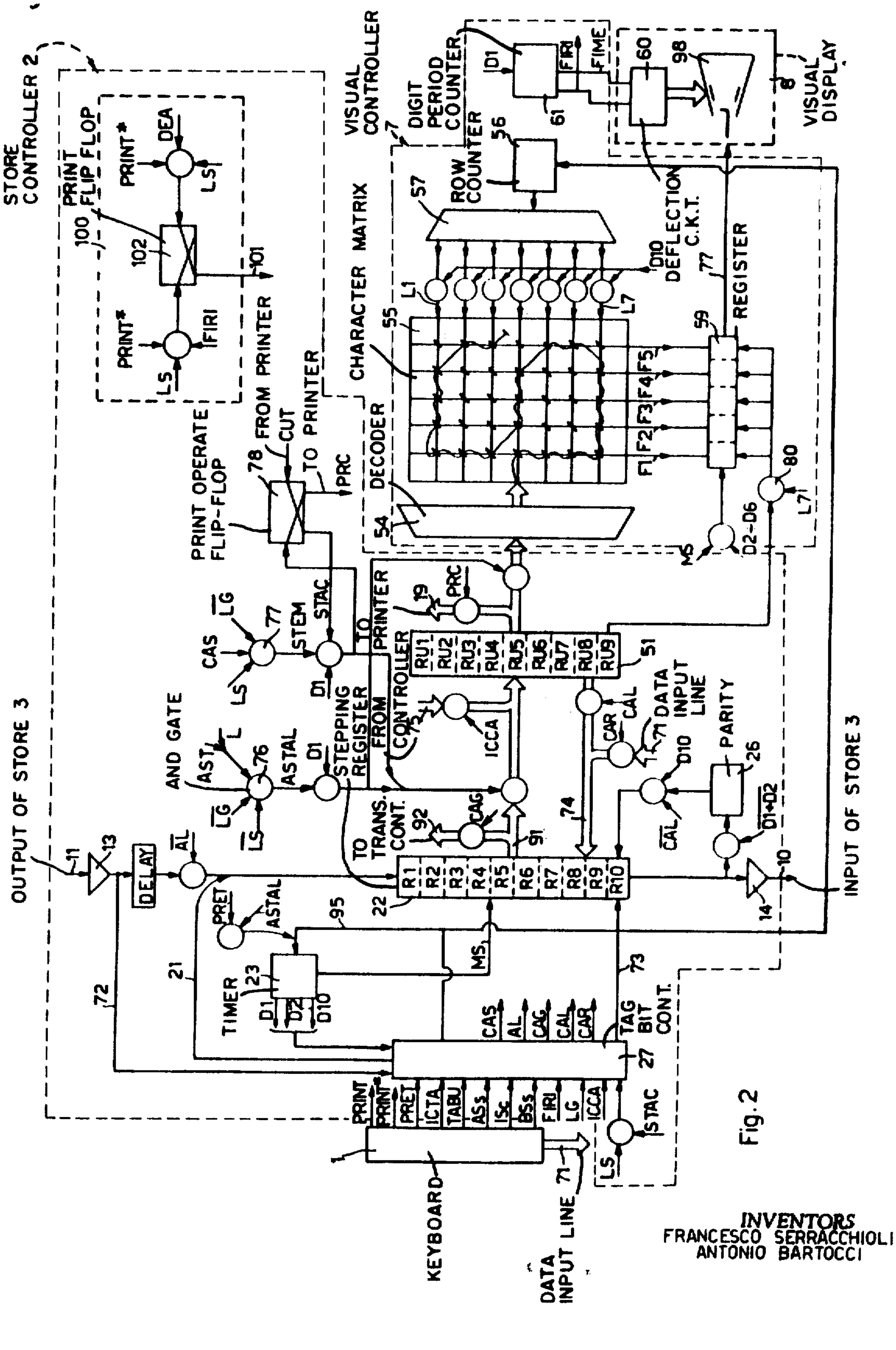
FIG. 2 is a more detailed block diagram of the control units of the store and of the visual display device.

The cores of the matrix 55 which are set to represent the character present in the bit period D1 in the stepping register 22 will remain in this state until the next bit period D10 and at the bit period D1 immediately following, the cores of the matrix will be put into a state such as to represent the following character in the store. As indicated in FIG. 2, each of the row wires L1–L7 of the core matrix is energized at each of the 256 signals D10 which follow one another during the store cycle in which the row is energized by the decoder 57. Therefore, the contents of the row of cores which is interrogated is transferred to the register 59 through the five reading wires F1–F5 of the matrix, each of which is linked together with all the cores in a column, and this happens at each of the bit periods D10. Consequently, during each store cycle, the register 59 is successively filled with the 256 groups of five bits which identify a given horizontal section of the representation produced in the matrix 55 of each of the 256 successive characters contained in the store. Similarly, in the following store cycle, the 256 groups of five bits which represent the following horizontal section of the 256 characters will be successively fed into the register 59, and so on for the succeeding store cycles up to the seventh.

The register 59 is a stepping register in which the transmission of the stepping pulses MS during the bit periods D2 to D6 of each digit period causes the output in series on the line 77 of the five bits which were introduced into the register 59 in the immediately preceding bit period D10. The binary signals issuing on the line 77 directly control the illumination of the screen of the cathode ray tube 98.

Figure 3:
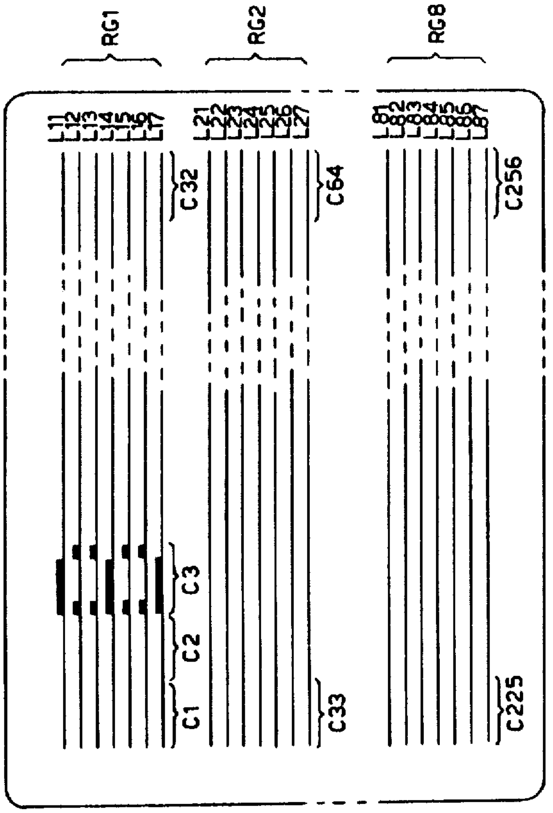
FIG. 3 shows in part the method of scanning the visual display screen.

The screen of the cathode ray tube is divided into eight rows RG1–RG8 (FIG. 3) each formed of seven lines. Each row can contain 32 characters, so that the whole screen can contain a total of 256 characters, equal to the contents of the delay line 3. In FIG. 3, the lines of the first row are indicated by the reference L11–L17, the lines of the second row by the references L21–L27, etc., the first numeral after the letter L specifying the row and the second numeral the line. The beam scans the first line L11 of the first row RG1, then the first line L21 of the second row RG2 and so on, starting from the left for each of the lines scanned. Having finished scanning the first line L81 of the eighth row RG8, the beam begins to scan the second line L12 of the first row RG1 and thus it progressively scans all the second lines and so on.

To carry out this type of scanning, the beam is controlled through a deflection control circuit 60 by a digit period counter 61 which supplies an end-of-row signal FIRI after each group of 32 digit periods and an end-of screen signal FIME after 256 digit periods. The scanning begins at each signal CS which identifies the beginning of a store cycle. The scanning of the screen takes place in synchronism with the circulation of the data in the store, the scanning of the screen being completed in seven store cycles and being repeated in the following cycles as long as the visual display order lasts. The time corresponding to seven store cycles is considerably less than the persistence of the images on the screen and on the retina. It is apparent from the foregoing that the 256 characters circulating in the store are methodically displayed on the screen starting from the top on the left and proceeding towards the bottom on the right.

It has already been seen that during the entering process on the keyboard the store cell following the last character entered contains in each case the bit *bs* indicating the position in which the series of characters written in the store terminates. An indicating sign also appears on the visual display screen in a position corresponding to this bit *bs*. For the visual display of this bit *bs*, the stage RU9 of the register 51 is filled with the contents of the stage R1 of the register 22 at the time D1 (which consists of the tag bit *bs*). When the counter 56 activates the seventh row L7 of the matrix and if at the same time the stage RU9 contains the bit "*bs*" = 1, five bits = 1 are entered directly in the register 59 through the gate 80 and will be stepped on in said register, therefore causing a horizontal dash to appear on the screen and visually displaying in this way the position following that of the last character actually present in the store. In this way, the contents of the delay-line store are fully displayed on the screen, there being strict correspondence between the delay line and the screen, as is clear from the foregoing description.

In the state of transmission of the message contained in the store 3 to the central processor, the presence of the reading signal LG generated by the line controller 4 inhibits the signal ASTAL and, therefore, the transfer of the successive characters in the store to the decoder 54 is also prevented. As an effect of the absence of energization of the matrix 55, the screen of the visual display device 8 is blacked out and this occurrence indicates to the operator the actual course of the transmission.

The terminal is moreover provided with means for enabling the format in which the data are introduced into the store from the keyboard to be controlled. This enables the message to be transmitted to the computer and transferred to the printing device to be compiled in the store by the operator in a manner chosen by him and consistent with the meaning of the message. For example, if the message is composed of a plurality of numbers or words, it is possible to tabulate them in accordance with various criteria at the choice of the operator. Control of the format is based, as will be seen, on control of the shifting of the tag bit *bs* from one store cell to another. The fact that the visual display device is continuously active in all the stages of entering data on the keyboard and is also adapted to display the bit *bs* enables the operator to have continuous control over the procedures of compilation of the message.

Moreover, at the moment of transmission to the computer, the line controller 4 inserts an end-of-block character ETB or ETX automatically, putting it in each case immediately after the 256th character position, and also a beginning-of-block character STX, putting this in each case before the first character position. The format of the message as compiled in the store is thereby preserved unchanged both in visual display and in transmission.

More particularly, the terminal is equipped with a "forward spacing " key, the effect of which is as follows. By operating this key, the operator can write a character in the store not in the cell immediately following the cell occupied by the character previously entered, but shifted by one whole cell period. By setting the aforesaid "forward spacing" key the operator generates a signal ASs, in response to which the circuit 27 causes the regeneration of the tag bit *bs* read on the line 72 not to occur, through the line 21, at the first D1 encountered, but at the following one, whereby the character thereupon entered on the keyboard is written in the store spaced by one cell with respect to the character previously written.

The terminal is moreover equipped with another key, a "-back spacing" key, the effect of which is as follows. By operating this key, there is generated a signal ISc, in response to which the circuit 27 causes the bit *bs*, when read along the line 72, not to be regenerated via the line 21 as usual, but to be regenerated via the line 73, that is shifted forward by one cell, that is to the D1 immediately preceding the character present in the store and accompanied by the tag bit *bs*. Therefore, the character next entered on the keyboard is written in the position now occupied by the character accompanied by the tag bit *bs*, thereby erasing and replacing this last character.

The terminal is furthermore provided with an additional key, which is a "row jump" key, by setting which the operator can cause the character next entered to be written in the store 3 in the cell occupying the position following cell C32, or cell C(32×*n* ,where *n* is from 1 to 7), i.e., in the position at the beginninG of the row RG*n* + 1, where the character previously entered on the keyboard occupied a cell position in the row RG*n*. To this end the "row jump" key generated a signal BSs, the effect of which on the circuit 27 is to cause the regeneration of the tag bit to be prevented. The circuit 27 waits for the counter 61 to send the signal FIRI, which signal is sent by this counter when it is in the state 32 (that is, has counted 32 digit periods or a multiple of 32). When the signal FIRI reaches the circuit 27, this circuit regenerates the tag bit *bs* through the line 21 at the first D1 that occurs. The character subsequently entered on the keyboard occupies the position following the position 32 or *n*×32 in the delay-line store, thus appearing visually displayed on the tube 98 at the beginning of the second or (*n*+1) th row.

Moreover, in order to cause numbers entered on the keyboard to be tabulated on the least significant digit, although the number is entered from the keyboard starting from the most significant digit, the first digit can be written in position C32 or a multiple of C32, then the second most significant digit can be written in the place of the first, the first being stepped back by one cell, and so on. In order to achieve this, the terminal is equipped with a "tabulating" key, the effect of which is as follows. By operating this key, there is generated a signal TABU, in response to which the circuit 27 causes the regeneration of the tag bit *bs* to be prevented when it is read along the line 72. When the circuit 27 receives the signal FIRI from the counter 61, which as has already been stated, indicates the cell positions n×32, the tag bit *bs* is regenerated through the line 73 and will therefore occupy the first binary place D1 of cell C32 or a multiple of C32. Moreover, the tag bit *bl* is forced through the line 73 into the binary place D2 of the aforesaid cell C32 (or a multiple of C32). The first digit entered from the keyboard by the operator immediately afterwards will therefore occupy cell C32 (or a multiple of C32).

On the following entry from the keyboard of the second digit, when the circuit 27 reads the tag bit *bl* it generates a signal AL which blocks the regeneration through the register 22 of the character already in the store immediately following the aforesaid tag bit *bl* and effects the regeneration of *bl* and of the aforesaid character through the line 73. At the same time, the second digit entered by the operator is introduced into the register 22 and the tag bit *bs* is regenerated through the line 21. Thus, as the digits from the most significant to the least significant are entered on the keyboard, this backward stepping by one whole cell is effected, thereby permitting the tabulating of the entered digits on cell C32 (or a multiple of C32).

The keyboard 1 is provided with a "printing selection" key which can be set only if there has been preceding assignment of the store to the keyboard, which condition is indicated by the presence of the signal AST on the part of the terminal controller 15. This position occurs when the terminal is in the free state (L) and the store reservation key is actuated, with generation of the signal PRET, or at the end of reception from the computer, when the line controller 4 sends an end-of-reception signal to the terminal controller 15 and the latter then assigns the store to the keyboard for a certain period of time, after which the store returns to the free state.

By means of the "printing selection" key, the operator therefore causes the assignment of the store 3 to the printing device 16 and a series of operations then start which produce the transfer of the contents of the store 3 to the printing device 16 through the connecting channel 17 (FIG. 1). This transfer is rhythmically operated by the printing device 16, which acts on the store controller 2 by means of a return channel 18 and through the terminal controller 15.

More particularly, the setting of the printing key causes the generation by the keyboard 1 of the signal PRINT, which, through the terminal controller 15, in the presence of the state AST, produces the change to a new state LS in which the terminal is assigned to printing. This state enables transfer in parallel of the bits of a character along the channel 17, which leads directly to the input of the printing device 16. The latter, for example, may be of the type described in U.S. Pat. No. 3,356,198 which is assigned to the assignee of the present invention.

Consequently, if the store 3 is assigned to the printing device, which condition is signalled by the terminal controller 15, the latter generates a signal LS ordering reading of the store and transfer to the printing device 16.

The signal LS, in the presence of the signal STAC, acts similarly to the signal LG previously described and therefore causes the circuit 27 to force along the line 21 the writing of a tag bit *bl* into the register 22 at the first bit period D2 immediately after having recognized the timing start bit CS via the line 72. On the following store cycle, the reading order LS, via the circuit 27, causes the regeneration of the aforesaid tag bit *bl* read on the line 72 not to occur, via the line 21, at the first D2 encountered, but at the following one, whereby the tag bit is stepped on in the store by one digit period.

In the state in which the store is assigned to the printing device, in which the signal LS is present, while the signals LG, AST and L are absent, the signal ASTAL is missing and, instead, the coincidence circuit 77 supplies the signal STEM which, at each bit period D1 in which there is also present the signal STAC corresponding to denergization of a flip-flop 78, enables transfer of the character which in that period is in the register 22, that is in the stages R3–R10 of that register, to the register 51.

The reading of the bit *bl* in the presence of the signals LS and STAC causes the circuit 27 to generate a signal CAS which enables the signal STEM to be reproduced through the gate 77.

The coincidence signal derived from STEM, STAC and D1 also activates a flip-flop 78, energizing the output PRC thereof, which signals to the printing device that the character to be printed is ready in the register 51, the output 19 of which to the printing device is rendered operative by PRC.

In this stage, the character to be printed remains in the register 51 and, because of the absence of the signal STAC (in consequence of the activation of the flip-flop 78), the signal CAS is missing, whereby there are no further transfers of characters from the register 22 to the register 51 and, moreover, the tag bit *bl* continues to circulate, remaining in the digit period in which it was last placed, that is in the digit period containing the next character to be extracted.

When the printing device has written the character supplied to it by the register 51, it sends a "character used" signal CUT, which resets the flip-flop 78, thus reestablishing the signal STAC which permits the condition of transfer of another character from the store to the output register 51.

The output register 51 therefore performs a dual function: when the terminal is free (L) or is assigned to the keyboard (AST), and therefore in the presence of the signal ASTAL, it functions as a feed register for the visual display device, while when the terminal is assigned to the printing device (LS), the register functions as a feeder for the printing device. In the case where the terminal is assigned to the printing device the transfer of each successive character to be printed from the store to the output register 51 is rhythmically operated by the printing device through the signal CUT.

The use of the register 51 in conjunction with the D1 bit in this manner allows the printing device 16 to operate asynchronously with the cyclic store 3 without the use of a large intermediate buffer.

It is to be noted that also in the case of transmission of the message contained in the store to the printing device the signal ASTAL is absent and, therefore, the transfer of the successive characters in the store to the decoder 54 is prevented. The screen of the visual display device 8 is therefore blacked out and this occurrence indicates to the operator the actual elapse of the printing process.

As has been already been stated hereinbefore, the terminal according to the invention enables the message received from a central processor to be modified by the addition or erasure of data or by insertion of service codes before sending the message to be printed. Moreover, it can modify the makeup or format of the data received, in the manner hereinafter described. In general, the central processor will also send, together with the data of the message, code "return to beginning" particulars which establish the format of the message according to the central processor; generally, these code "return to beginning" particulars are not visually displayed and in this case it is assumed that they are entered in the first digit period following that of the last character displayed in a row of the screen. It is therefore possible to erase the "return to beginning" codes and, by means of a special key which operates following the shifting of the tag bit *bs* into a suitable position, to enter them in another digit period, provided that this is vacant or the previously contained character is erased, with the result of modifying the format of the message to be printed. The "return to beginning" codes control the return of the printing device to the beginning.

The keyboard of the terminal apparatus embodying the invention also has available special "partial printing" and "partial sending" keys, both selectable as an alternative to the normal keys controlling printing and controlling transmission to the computer, respectively. As the manner in which these two special keys operate is similar, the condition in which the terminal is assigned to the printing device or assigned to the computer being the only difference, only the use of the "partial printing" key is described.

When it is intended to send for printing only the message contained in one or more rows or in a fraction of a row of the screen of the visual display device, operation is effected in the following manner. By actuating the appropriate keys for the shifting of the tag bit *bs*, the visible sign corresponding to this bit is brought into the position immediately preceding the first character that it is intended to print. In this position, a special key is set and writes an "asterisk" character in the store. The following setting of the "partial printing" key causes the printing of that part of the message which is between the asterisk and the end of the row. By entering a plurality of asterisks in different rows it is possible to select the contents of all the rows containing the "asterisk" sign, the principle being to print that part of the message which in each row is between the asterisk and the end of the row.

In order to obtain this result, it is sufficient to use a logic network 100 as illustrated in FIG. 2, the output 101 of which acts in the circuit 27, causing the writing of the tag bit *bl* in the register 22 at the first bit period D2 immediately after having recognized the "asterisk" character via the line 72 and causing in the following store cycle the stepping on of said bit *bl* to the second D2 encountered. Under these conditions, the generation of the signal CAS, which enables transfer from the store to the printing device, will again be effected by the circuit 27 after the reading of the bit *bl*, which, however, will be accompanying the first character following the "asterisk" character, and therefore the transmission of the message for printing will begin from the character marked by *bl*. The logic network 100 comprises a flip-flop 102, which is rendered operative when the "partial printing" key has been set, this key generating the signal PRINT*, and the terminal controller 15 has consequently produced the condition in which the terminal is assigned to the printing device, sending the signal LS, and the "asterisk" character is moreover read and recognized through the line 72 and the circuit 27, generating the signal DEA. The flip-flop 102 will be rendered inoperative, still in the presence of the signals LS and PRINT*, by the end-of-row signal FIRI, thus interrupting the sending of characters to the printing device; on the other hand, the reading of a second "asterisk" character will again produce the activation of the flip-flop 012 and, therefore, the sending of other characters for printing until the following signal FIRI, and so one.

In this terminal apparatus the printing of the message contained in the store and visually displayed can be commanded repeatedly so as to obtain a plurality of reproductions of the displayed message in permanent form.

The terminal apparatus for transmitting and receiving data can be used in association with a central processor for instance for the continuous bringing up to date of pages of archives or records, in which the pages may show lists of different data according to the field of use (for example bank account statements, statements of materials in stock, etc.). In this case, during connection with a central processor equipped with a record store, the terminal, using a special conversation procedure, for example that described in the three specifications first cited above, will request the position with the pages relating to a given class of data. The central processor will supply the terminal with the data on each page, which will read on the visual display device, checked and brought up to date by the operator by the introduction of other data from the keyboard. The page checked and brought up to date in this way will then be sent to the central processor and, if necessary, also to the printing device, if it is desired to have a reproduction of the contents of that page in permanent form.

The use of the "asterisk" character and of the "partial sending" key makes it possible to send to the central processor only the corrections or the data bringing the position up to date, whereby there is obtained a saving in the volume of information to be transmitted from the terminal.

Moreover, it will be possible to insert at the bottom of each page by means of the terminal a special "turn page over" character, which, when transmitted to the central processor, will advise it that the terminal requests the data contained on the following page of the records.

What is claimed is:

1. In terminal apparatus for sending and receiving multicharacter information respectively to and from a data processing system, a memory-accessing arrangement comprising:

a. a cyclic recirculating serial store comprising a plurality of cells for storing characters of information to be sent or received, said store including means for selectively storing a tag bit in a cell of the store and for shifting the tag bit to other cells;

b. a display device for visually displaying the information contained in the store;

c. a printing device for printing the information in said store character by character as a plurality of lines of characters, and for generating a transfer signal;

d. single character register means for storing the next character to be printed, said register being coupled to said printer for transferring said next character thereto and e. means responsive to the transfer signal from said printing device for transferring the character in the cell in the store having the tag bit associated therewith to said register, said store being responsive to the transfer of the character to said register for causing said shifting means to shift said tag bit to the following cell.

2. The apparatus of claim 1 further including means for dividing the characters read out of said store into a plurality of groups and wherein said printing device, which prints out the information in said store as a plurality of lines of characters, prints one line per group.

3. The apparatus of claim 2 further including:

a. means for selectively storing special control characters in selected cells of said store, and b. means responsive to said special control characters for printing as one of said lines only those characters which follow one of said control characters within one of said groups in which said one control character appears.

* * * * *

UNITED STATES PATENT OFFICE

CERTIFICATE OF CORRECTION

Patent No. 3,648,251 Dated March 7, 1972

Inventor(s) Francesco Serracchioli et al

It is certified that error appears in the above-identified patent and that said Letters Patent are hereby corrected as shown below:

Column 4, line 6, after "forced" should read -- into the last stage R10 of the register R1-R10. The bit forced --. Column 5, line 7, after "character" should read -- from the output 91 of the register 22 to the input 92 of the character --. Column 10, line 46, "012" should read -- 102 --.

Signed and sealed this 7th day of November 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334.